(12) United States Patent
Klassen

(10) Patent No.: US 10,876,670 B2
(45) Date of Patent: Dec. 29, 2020

(54) BLIND FLANGE AND METHOD OF INSTALLING SAME FOR ISOLATING HAZARDOUS ENERGY WITHIN A FACILITY

(71) Applicant: Suncor Energy Inc., Calgary (CA)

(72) Inventor: Jason Klassen, Fort McMurray (CA)

(73) Assignee: Suncor Energy Inc., Calgary (CA)

( * ) Notice: Subject to any disclaimer, the term of this patent is extended or adjusted under 35 U.S.C. 154(b) by 52 days.

(21) Appl. No.: 16/242,702

(22) Filed: Jan. 8, 2019

(65) Prior Publication Data

US 2019/0219212 A1 Jul. 18, 2019

(30) Foreign Application Priority Data

Jan. 12, 2018 (CA) ..................................... 2991728

(51) Int. Cl.
- *F16L 23/00* (2006.01)
- *F16L 55/115* (2006.01)
- *F16L 23/032* (2006.01)

(52) U.S. Cl.
CPC ........... *F16L 55/115* (2013.01); *F16L 23/003* (2013.01); *F16L 23/032* (2013.01); *F16L 55/1152* (2013.01)

(58) Field of Classification Search
CPC ......... F28F 2275/20; F28F 9/0219; F16L 9/00
USPC ................................. 138/109; 285/412, 368
See application file for complete search history.

(56) References Cited

U.S. PATENT DOCUMENTS

| | | | | |
|---|---|---|---|---|
| 4,381,871 A | * | 5/1983 | Dopyera | F16L 27/053 285/261 |
| 4,530,526 A | * | 7/1985 | Dopyera | F16L 27/053 285/261 |
| 4,640,348 A | * | 2/1987 | Roberts | F28F 9/0219 165/158 |
| 5,316,320 A | * | 5/1994 | Breaker | F16L 23/16 277/611 |
| 6,419,279 B1 | * | 7/2002 | Latham | F16L 23/036 285/261 |
| 6,979,028 B2 | * | 12/2005 | Muroi | F16L 27/1012 285/223 |

* cited by examiner

*Primary Examiner* — Patrick F Brinson
(74) *Attorney, Agent, or Firm* — Gowling WLG (Canada) LLP

(57) ABSTRACT

Implementations of the present disclosure relate to a blind flange and a method of installing same for isolating hazardous energy in order to provide a safe environment for workers to conduct maintenance or repair work on a facility. The blind flange has a body that defines one or more modified bores. The one or more modified bores are alignable with flanged-connection apertures of one side of a flanged connection. The one or more modified bores are configured to receive and releasably hold a connection member therein, so as to connect to only one side of the flanged connection. The modified bores allow a blind flanged-connection to be disassembled and reassemble in less time than known blind flanged-connections when one side of the blind flanged-connection is disconnected from the blind flanged-connection. Furthermore, the blind flange of the present disclosure allows the blind flange to remain connected to one side of a flanged connection while the other side is disconnected.

13 Claims, 3 Drawing Sheets

FIG.3A
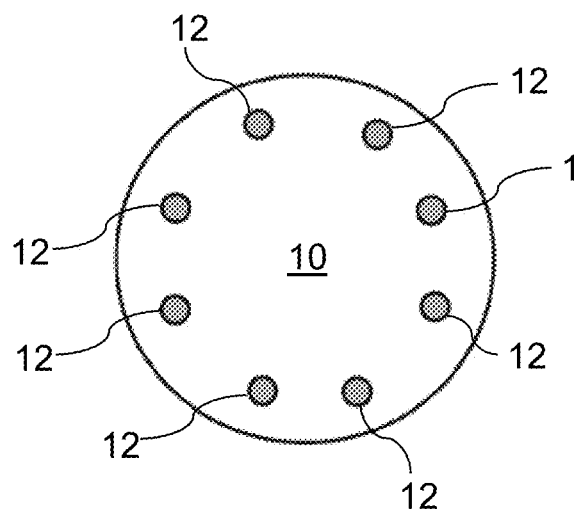
FIG.3B
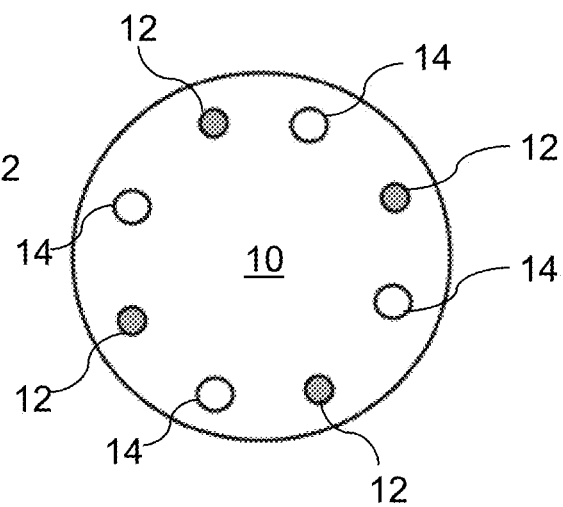
FIG.3

BLIND FLANGE AND METHOD OF INSTALLING SAME FOR ISOLATING HAZARDOUS ENERGY WITHIN A FACILITY

TECHNICAL FIELD

The present disclosure generally relates to facility maintenance or repair. In particular, the disclosure relates to an apparatus and method for isolating hazardous energy that can be used during facility maintenance or repair.

BACKGROUND

A facility requires scheduled maintenance and/or emergency repair in order to keep the facility operating at desired levels. Such facilities often utilize one or more forms of hazardous energy to operate the facility. Some examples of hazardous energy include, but are not limited to: electrical energy, pneumatic potential-energy, mechanical potential-energy, hydraulic potential-energy, radiation or gravitational potential-energy, any of which can harm individuals exposed thereto. As such, facility maintenance and repair procedures often require isolation of the hazardous energy so that personnel can safely perform maintenance or repair work without risk of being exposed to the hazardous energy.

Isolating hazardous energy is achieved by procedures and processes that prevent the flow or presence of hazardous energy through the facility and/or the portion thereof that is being maintained or repaired. One such process is to establish perimeter blinds. Perimeter blinds prevent the flow of hazardous energy both upstream and downstream of the entire facility, or the relevant portion thereof.

A known method of stopping the flow of hazardous energy through fluid-conducting pipes and vessels is to stop the flow of fluids by closing one or more valves. Additionally, or alternatively, a blind flange can be installed within one or more flanged connections that fluidly connect the fluid-conducting pipes and vessels. Flanged connections can also be referred to as flanged joints. A flanged connection typically includes two opposing sides that are held together by multiple flanged-connection studs that extend across both of the opposing sides and are secured in place by releasable fasteners. The flanged-connection studs are received through flanged-connection apertures that are typically arranged around the perimeter of each side of the flanged connection. The blind flange, which can also be referred to as blinds, spacers or blanks, is a plate that seals against fluid communication through the flanged connection. The blind flange can include one or more bores that can be aligned with the flanged-connection apertures of the two sides of the flanged connection for receiving the flanged-connection studs therethrough.

During installation of a blind flange, the flow of fluids through the flanged connection is stopped, through prior hazardous-energy isolation procedures, the flanged connection is disassembled by removing the flanged-connection studs from one or both sides of the flanged connection. Then the blind flange is positioned between the two sides of the flanged connection, the flanged-connection studs are inserted through the flanged-connection apertures and the bores of the blind flange. The flanged-connection studs are then releasably secured in position to form a blind flanged-connection. Depending on the number of flanged-connection studs, the time required for assembling a blind flanged-connection can take between 1 and 3 hours per flanged connection.

In addition to forming perimeter blinds, hazardous-energy isolation procedures can also require that further blind flanged-connections are assembled within a facility. For example, if the maintenance or repair process requires one or more workers to physically enter a confined space, hazardous-energy isolation procedures often require that additional blind flanged-connections are assembled both upstream and downstream of and proximal to the confined space. Typically work within the confined space cannot proceed until such time that the proximal upstream and downstream blind flanged-connections are assembled. However, often times the pipe or vessel that forms one side of the proximal upstream or downstream blind flanged-connections itself requires further maintenance or repair work. This further maintenance or repair work can require disassembly of the relevant blind flanged-connection, which means that work within the confined space must be put on hold, which is also referred to as an interruption of the hazardous-energy isolation, until the blinded-flanged connection is reassembled. The implication of which is that blind flanged-connections can require assembly, disassembly and reassembly once or multiple times in order to perform maintenance or repair work on confined spaces and other nearby sections of the facility.

SUMMARY

Some implementations of the present disclosure relate to a blind flange that comprises a body and one or more modified bores. The one or more modified bores are defined by the body and the one or more modified bores are alignable with flanged-connection apertures of a flanged connection. The one or more modified bores are configured to receive and releasably hold a connection member therein and the connection member is configured to releasably connect the body to only one side of a flanged connection.

Some implementations of the present disclosure relate to a method for assembling a blind flanged-connection. The method comprises a step of inserting a blind flange between a first side and a second side of a flanged connection, wherein the blind flange comprises one or more modified bores for receiving and holding a connection member therein. The method includes a step of aligning at least one of the one or more modified bores with at least one flanged-connection aperture of the first side of the flanged connection. The method also includes the steps of inserting a connection member into the aligned at least one modified bore and the at least one flanged-connection aperture of the first side and inserting a flanged-connection stud through a flanged-connection aperture of the second side, a modified bore or a bore of the blind flange and another flanged-connection aperture of the first side.

Implementations of the present disclosure relate to a blind flange that can be installed into a flanged connection. When installed, the blind flange can be releasably connected to both sides of the flanged connection by multiple flanged-connection studs. The installed blind flange can also be releasably connected to only one side of the flanged connection. The implications of which are that the entire flanged connection can be disassembled by removing all of the flanged-connection studs, which allows the two sides of the flanged connection to be separated but the blind flange can still be releasably connected to one side of the flanged connection by one or more connection members that extend through a modified bore of the blind flange and the one side of the flanged connection. Having the blind flange releasably connected to one side of the flanged connection allows the flanged connection to be dissembled while maintaining the blind closure of one side of the flanged connection.

Without being bound by any particular theory, implementations of the present disclosure can reduce the number of flanged-connection studs that can be used in order to assemble, disassemble and reassemble a blind flanged-connection. This is because the blind flange is releasably connected to one side of the flanged connection by one or more connection members. The one or more connection members occupy the limited number of bores that are available to secure the two sides of the flanged connection together, which in turn reduces the number of bores that are available to receive flanged-connection studs. The reduced number of flanged-connection studs means that less time is required to assemble and disassemble one side of the flanged connection while still providing hazardous-energy isolation. Furthermore, implementations of the present disclosure can provide hazardous-energy isolation on the side of the flanged connection that is still connected to the blind flange when the flanged connection is disassembled. This allows maintenance or repair work to occur at the same time on both sides of a disassembled and blind flanged-connection.

BRIEF DESCRIPTION OF THE DRAWINGS

These and other features of the present disclosure will become more apparent in the following detailed description in which reference is made to the appended drawings, which illustrate by way of example only:

FIG. 2 is side elevation view of a blind flanged-connection with a partial cut away to reveal studs, apertures and bores of the blind flanged-connection, wherein FIG. 2A is a blind flanged-connection that is assembled with a conventional blind and flanged-connection studs that extend across the entire blinded flanged-connection and FIG. 2B shows a blind flanged-connection that is assembled with a blind according to implementations of the present disclosure, flanged-connection studs that extend across the entire blinded flanged-connection and a cap screw that does not extend across the entire blinded flanged-connection; and FIG. 3 is a top-plan view of blinds, wherein FIG. 3A shows one blind according to implementations of the present disclosure and FIG. 3B shows another blind according to other implementations of the present disclosure.

DETAILED DESCRIPTION

Figure 1:
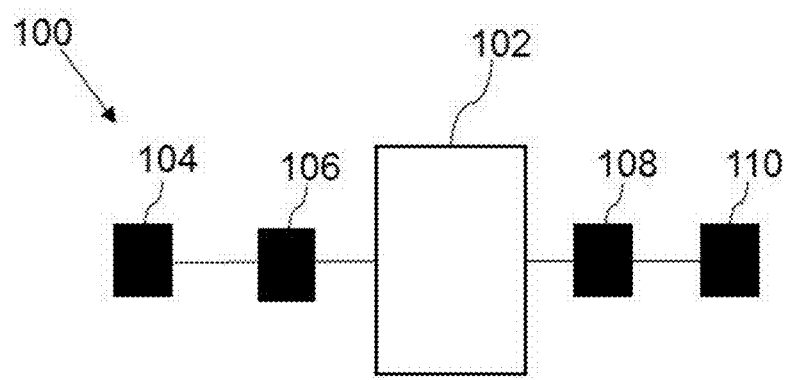
FIG. 1 is a schematic of a facility that includes sites of hazardous-energy isolation and a vessel that requires entry of a worker for maintenance or repair work.

FIG. 1 is a schematic of a facility 100 that includes multiple sections 102, 104, 106, 108 and 110. It is understood that the number of sections shown in FIG. 1 is not intended to be limiting. The facility 100 can be a variety of facilities that operates at least partially based upon the flow of one or more forms of hazardous energy therethrough. For example, the facility 100 can be a hydrocarbon fluid processing facility with a flow of hydrocarbon fluids or other process streams from a first end proximal section 104 through to a second end proximal section 110. The flow of hydrocarbon fluids passes through the fluidly connected sections 102, 104, 106, 108, 110. Each section can be the same or something different. For example, one, some or all of the sections 102, 104, 106, 108, 110 can be part of a fluid conducting system within the facility 100 and each section can be a pipe, a vessel or other type of conduit. Alternatively, one, some or all of the sections 102, 104, 106, 108, can be operational sections that perform specific tasks within the facility 100. For example, the section 102 (or any other section depicted in FIG. 1) can be a furnace, a coker drum, a cooling tower, a storage vessel, a containment vessel, or any other type of apparatus that performs specific tasks within the facility 100. As will be appreciated by one skilled in the art, these examples of the facility 100 are not limiting in to the scope of the present disclosure and various other facilities that include a section 102 that requires hazardous-energy isolation in order to allow maintenance work or repair work to proceed. In some implementations of the present disclosure the section 102 is a confined space that a worker must physically enter in order to conduct the maintenance work or the repair work.

The forms of hazardous energy can include but are not limited to: electrical energy, pneumatic potential-energy, mechanical potential-energy, hydraulic potential-energy, radiation, gravitational potential-energy or combinations thereof.

In order to protect the worker, the hazardous energy must be isolated across the facility 100 or at a minimum at the section 102 upon which the maintenance or repair work is to be performed. Perimeter blinds can be established at upstream of section 104 and downstream of section 10 to stop to the flow of hazardous energy across the facility 100. Furthermore, when the section 102 is a confined space, further blinds can be installed at access points, both upstream and downstream, of the section 102. For example, sections 106 and 108 can each represent a flanged connection that are immediately upstream and downstream, respectively, of the section 102. Installing further blinds at the sections 106, 108 provides further protection from hazardous energy so that a worker can safely work within the confined space of section 102.

Figure 2:
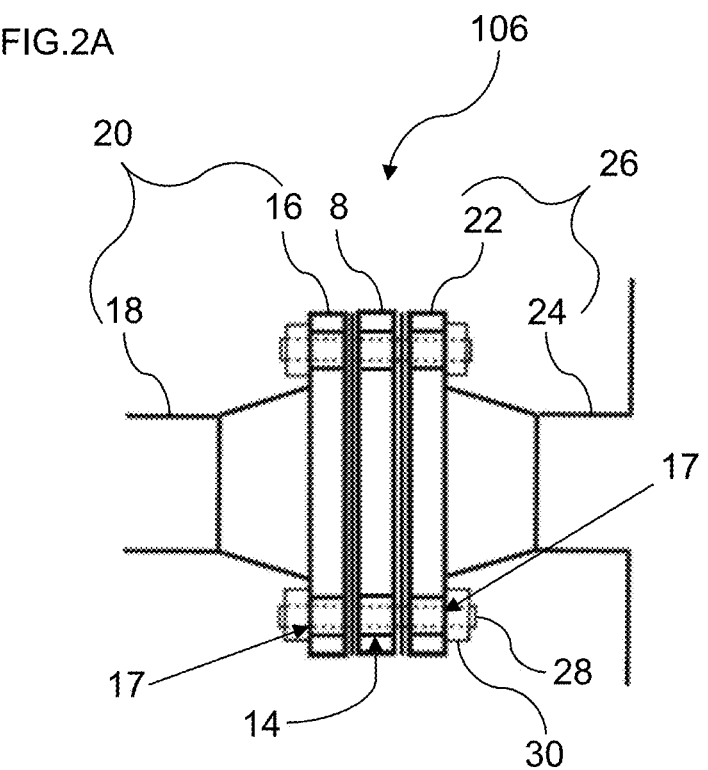
Figure 2:
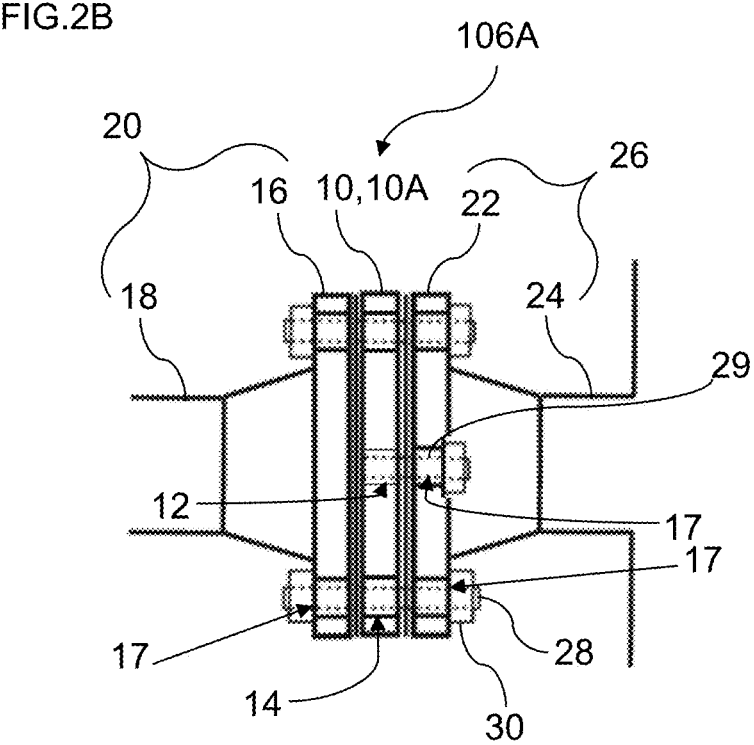

FIG. 2A shows one example of a blind flanged-connection 106 that includes a first side 20, a second side 26 and an example of a blind 8 known in the prior art. The first side 20 has a first flange 16 and a first further section 18 and the second side 26 has a second flange 22 and a second further section 24. The first and second flanges 16, 18 each define flanged-connection apertures 17. The flanged-connection apertures 17 of the first flange 16 are alignable with those of the second flange 18, and vice versa. The flanged-connection apertures 17 are configured to receive a flanged-connection stud 28 therethrough, which are releasably secured in position by a releasable fastener 30 at each end. Examples of suitable threaded fasteners 30 include, but are not limited to: nuts, studs, cap screws and the like. The blind 8 defines circumferentially arranged bores 14 that are aligned with flanged-connection apertures 17 and when the blind 8 is installed within the flanged connection 106, the blind 8 also receives flanged-connection studs 28 therethrough. When installed the blind 8 provides a fluid tight seal to prevent the flow of fluids and any hazardous energy associated with such flow through the flanged connection 106.

FIG. 2B shows a blind flanged-connection 106A that is the same blind flanged-connection 106 as shown in FIG. 2A except that the blind 8 is replaced by a blind flange 10 that is according to implementations of the present disclosure. The blind flange 10 can be shaped to match the cross-sectional shape of the flanged connection 106A. For example, the blind flange 10 can have a generally circular body from a top-plan perspective with an outer diameter is selectable to fit the dimensions of the flanged connection 106A. As will be appreciated by one skilled in the art, the body of the blind flange 10 can be made of any desired shape so as to form a desired fluid-tight seal with flanged connections that aren't circular. Furthermore, the blind flange 10 can be selected from various materials and thicknesses depending upon the desired pressure-rating.

The body of the blind flange 10 defines one or more modified bores 12 that are circumferentially arranged in a radial pattern to allow each of the modified bores 12 to align with opposed flanged-connection apertures 17 of the flanged connection 106A. Each modified bore 12 can receive a connection member 29 therethrough. The connection member 29 can connect the blind flange 10 to either the first side 20 or the second side 26 of the flanged connection 106A, but not both.

In some implementations of the present disclosure, an inner surface of each modified bore 12 is at least partially tapped, tapered, threaded or otherwise modified to receive and hold each connection member 29 in place and, therefore, the blind flange 10 is held connected to one side of the blind flanged-connection 106A. In some implementations of the present disclosure the connection member 29 can be configured to releasably connect with the blind flange 10. In one non-limiting example, the connection member 29 can be a threaded fastener, such as a cap screw or other types, that releasably connects with the inner surface of the modified bore 12.

FIG. 3A shows one implementation of the blind flange 10 where every modified bore 12 is configured to receive and releasably hold a connection member 29. FIG. 3B shows another implementation of the blind flange 10 where there are both modified bores 12, each of which are configured to receive and releasably hold a connection member 29, and one or more bores 14, each of which can receive a flanged-connection stud 28. In some implementations of the present disclosure there can be an equal amount number of bores 14 as compared to modified bores 12, or not. In some implementations of the present disclosure the modified bores 12 and the bores 14 can be circumferentially arranged in an alternating, radial pattern (see FIG. 3B). The number of modified bores 12 that are defined by the blind flange 10 can be varied depending upon the design specifications and size requirements of the facility 100 and the form of hazardous energy that is being isolated.

In use, a flanged-connection 106 can be disassembled by releasing all of the flanged-connection studs 28. Then a blind flange 10 can be installed between the first side 20 and the second side 26. Next the modified bores 12 and the bores 14 (as the case may be) are aligned with the flanged-connection apertures 17 of the second side 26. A connection member 29 is inserted into each modified bore 12 and into each aligned flanged-connection aperture 17 of the second side 26 for releasably connecting the blind flange 10 to the second side 26. When the blind flange 10 is connected to the second side 26 (via the connection members 29) the first side 20 is then connected to both the blind flange 10 and the second side 26 by flanged-connection studs 28 through the remaining flanged-connection apertures 17 that are not blocked by connection members 29. Each flanged-connection stud 28 can then be releasably secured in place with a releasable fastener, such as a threaded fastener 30. In some implementations of the present disclosure the connection members 29 are also releasably secured to the second flange 22 by a threaded fastener 30. This method forms a blinded flanged-connection 106A with a blind flange 10 according to implementations of the present disclosure.

In some implementations of the present disclosure, the second side 26 to which the blind flange 10 is connected can be selected based upon the second further section 24 forming part of the section 102, which can define a confined space. The second side 26 can also be referred to as the vessel side or the mechanical side. Implementations of the present disclosure allow a partial disassembly of the blind flanged-connection 106A by removing all flanged-connection studs 28 and disconnecting the first side 20 only. With the blind flange 10 still connected to the second side 26 the maintenance work or repair work can be performed on the disconnected first side 20 at the same time as work is being performed on the second side 26, for example within a confined space that remains isolated from hazardous energy by the presence of the blind flange 10. As one skilled in the art can appreciate, all flanged connections that conduct fluids and/or hazardous energy into or out of the section 102 can have a blind flange 10 installed therein to form blind flanged-connections 106A.

I claim:

1. A blind flange comprising:
   a. a body adapted to block a flow of hazardous energy through a flanged connection; and
   b. one or more modified bores that are defined by the body, the one or more modified bores are alignable with flanged-connection apertures of the flanged connection and the one or more modified bores are configured to receive and releasably hold a connection member therein, wherein the connection member is configured to releasably connect the body to only a first side of the flanged connection.

2. The blind flange of claim 1, wherein the one or more modified bores are at least one of a partially tapped bore, a tapered bore and a threaded bore for releasably holding the connection member.

3. The blind flange of claim 1, wherein the one or more modified bores are circumferentially arranged in a radial pattern.

4. The blind flange of claim 1, further comprising one or more bores that are configured receive a flanged-connection stud.

5. The blind flange of claim 4, wherein there is an equal number of the one or more modified bores and the one or more bores.

6. The blind flange of claim 4, wherein the one or more modified bores and the one or more bores are circumferentially arranged in an alternating, radial pattern.

7. A method for assembling a blind flanged-connection, the method comprising steps of:
   a. inserting a blind flange between a first side and a second side of a flanged connection, wherein the blind flange comprises one or more modified bores for receiving and holding a connection member therein;
   b. aligning at least one of the one or more modified bores with at least one flanged-connection aperture of the first side of the flanged connection;
   c. inserting a connection member into the aligned at least one modified bore and the at least one flanged-connection aperture of the first side; and
   d. inserting a flanged-connection stud through a flanged-connection aperture of the second side, a modified bore or a bore of the blind flange and another flanged-connection aperture of the first side.

8. The method of claim 7, wherein the first side and the second side are part of a facility that operates at least partially based upon the flow of one or more forms of hazardous energy between the first side and the second side.

9. The method of claim 8, wherein the one or more forms of hazardous energy are electrical energy, pneumatic potential-energy, mechanical potential-energy, hydraulic potential-energy, radiation, gravitational potential-energy or combinations thereof.

10. The method of claim 7, wherein the first side defines a confined space.

11. The method of claim 7, wherein the one or more modified bores are at least one of a partially tapped bore, a tapered bore and a threaded bore for releasably holding the connection member.

12. The method of claim 7, wherein the connection member is a threaded fastener.

13. The blind flange of claim 4, wherein the flanged-connection stud is configured to releasably connect the body to both the first side of the flanged connection and a second side of the flanged connection.

* * * * *